United States Patent [19]

Miller

[11] Patent Number: 5,115,113

[45] Date of Patent: May 19, 1992

[54] SPOT WELDING METHOD AND APPARATUS HAVING WELD ELECTRODE LOCK-UP

[75] Inventor: Earl G. Miller, Shelby Township, Macomb County, Mich.

[73] Assignee: General Motors Corporation, Detroit, Mich.

[21] Appl. No.: 587,202

[22] Filed: Sep. 24, 1990

[51] Int. Cl.⁵ .............................................. B23K 11/10
[52] U.S. Cl. ..................................... 219/89; 219/117.1
[58] Field of Search ............... 219/89, 108, 110, 86.51, 219/86.41, 117.1

[56] References Cited

U.S. PATENT DOCUMENTS

| | | |
|---|---|---|
| 3,553,420 | 1/1971 | Shearer, Jr. .................. 219/110 |
| 4,073,217 | 2/1978 | Colin . |
| 4,303,231 | 12/1981 | Reuschenbach et al. . |
| 4,309,027 | 1/1982 | Molders et al. . |
| 4,329,559 | 5/1982 | Kishi et al. . |
| 4,334,624 | 6/1982 | Detmold . |
| 4,619,188 | 10/1986 | Kimura . |
| 4,625,836 | 12/1986 | Pigott . |
| 4,793,450 | 12/1988 | Savenijie . |
| 4,812,612 | 3/1989 | Perkins . |

*Primary Examiner*—Clifford C. Shaw
*Attorney, Agent, or Firm*—Creighton R. Meland

[57] ABSTRACT

A method and apparatus for single-sided resistance spot welding that prevents excessive weld indentation. A first flat part and a tubular part are clamped between welding electrodes with a predetermined welding force. A welding current is applied to the electrodes to heat the parts where the spot weld is made. One of the electrodes is locked from movement as welding current is applied to prevent that electrode from indenting into the heated weld zone.

8 Claims, 1 Drawing Sheet

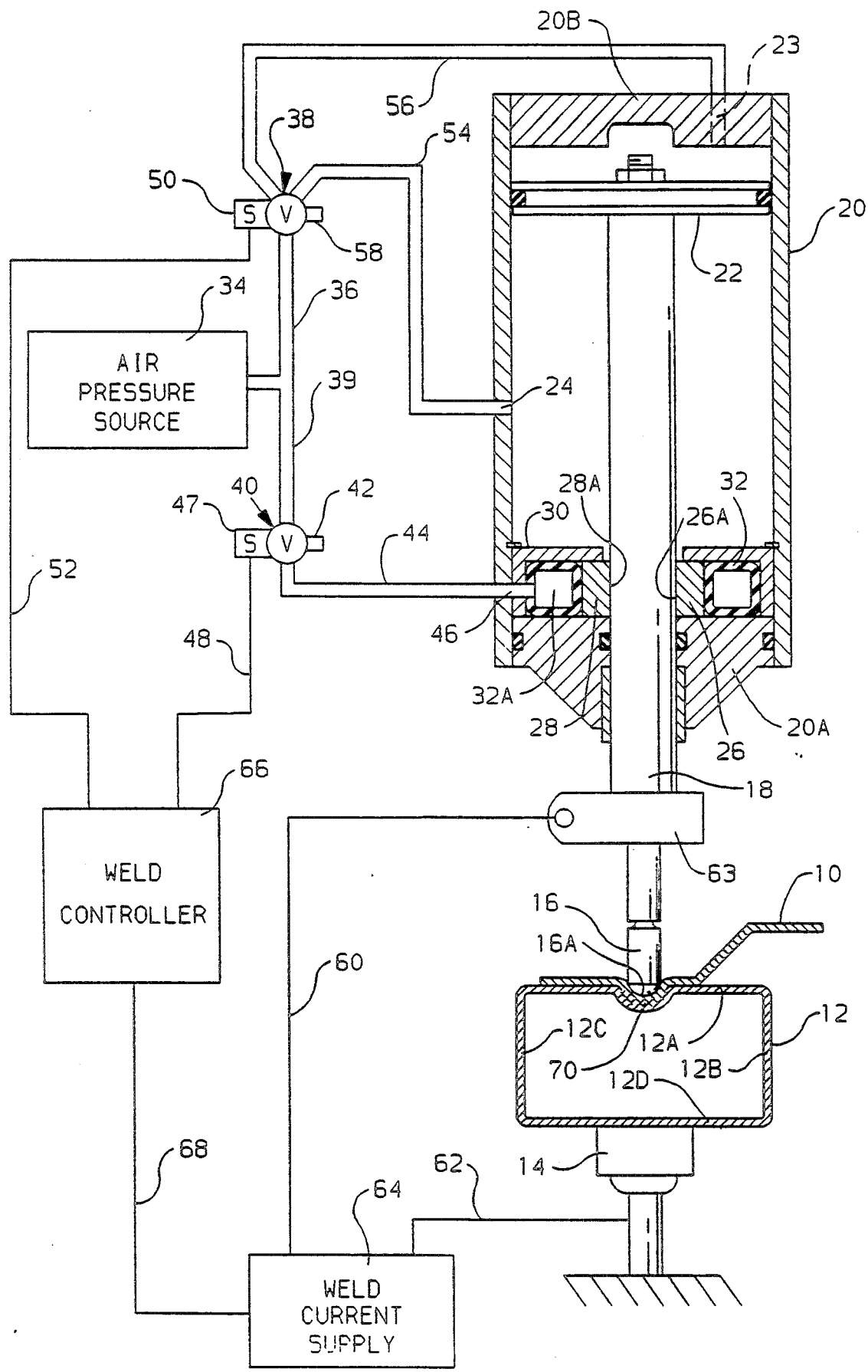

SPOT WELDING METHOD AND APPARATUS HAVING WELD ELECTRODE LOCK-UP

The invention relates to a method and apparatus for resistance spot welding that reduces the amount of indentation in the welded parts caused by electrode indentation.

In certain applications of resistance spot welding, for example, automobile bodies, it is desirable to be able to resistance spot weld a part such as a flat metallic part to a closed-section rectangular tubular metallic part. Since there is limited access to the interior of the tubular part for a welding electrode, so-called single-sided spot welding can be used. In single-sided spot welding, a flat metal part is welded to one outside wall of the tubular part. This can be accomplished by disposing the flat metal part and tubular part between a back-up electrode and a welding electrode. A first outside wall of the tubular part engages the back-up electrode. The flat part engages a second outside wall of the tubular part. The second outside wall is located directly opposite the first outside wall. The welding electrode is moved and it forces the flat metal part into tight engagement with the second outside wall and a predetermined welding force or clamping force is applied. After a squeeze time, welding current is applied to the electrodes. This welding current passes through the welding electrode, then through the flat metal part to the second outside wall and then through this wall and the other walls of the tubular part to the back-up electrode.

Single-sided spot welding has a tendency to produce excessive indentation in the flat metal part and in the wall of the tubular part that is welded to the flat part. Thus, in single-sided spot welding, there is no electrode engaging the internal surface of the wall of the tubular part that is being welded to the flat part. Consequently, there is no direct electrode support on the inside of the tubular part for the wall that is being welded. As a result of this, when a welding force is applied to the welding electrode and after welding current is applied, portions of the flat part and of the wall of the tubular part are heated to such an extent that these portions tend to yield under the pressure being applied to the welding electrode with the result that the welding electrode moves into the flat part causing an excessive indentation in both the flat part and in the wall of the tubular part. Such excessive indentation is undesirable both from a cosmetic appearance standpoint and from the standpoint of producing quality weld.

It is an object of this invention to provide a method and apparatus for single-sided resistance spot welding that reduces the amount of indentation of the welds that are made. This is accomplished by providing means for locking a welding electrode from movement after it has been forced to a welding position and during the time that welding current is applied. Thus, the welding electrode cannot be forced into the yieldable heated metal because it is locked from movement. Accordingly, weld indentation is reduced by not allowing penetration of the welding electrode into the heated metal.

In The Drawings

The single FIGURE drawing illustrates a single-sided welding apparatus made in accordance with this invention.

Referring now to the drawing, a single-sided spot welding apparatus is illustrated for spot welding a part 10 to a tubular part 12. Part 12 has walls 12A, 12B, 12C and 12D. Parts 10 and 12 can be formed of steel and can be parts of an automotive body. The part 12 may be a tubular pillar and part 10 a part that is required to be spot welded to the pillar. By way of example, and not by way of limitation, the material of part 12 may be less than 1.5 mm. thick. The thickness of part 10 should be less than the thickness of part 12.

The welding apparatus comprises a fixed back-up electrode 14 that engages wall 12D of part 12 to support the tubular part 12. The welding apparatus includes a movable electrode 16 which is shown engaging part 10. Electrode 16 has a ball-shaped tip 16A. The movable electrode 16 is connected to a cylinder shaft 18 of a pneumatic cylinder 20 so that electrode 16 moves with shaft 18. A piston 22 is disposed in cylinder 20 and it is attached to shaft 18. The cylinder has end housings 20A and 20B.

The cylinder 20 has ports 23 and 24 that permit air pressure to be selectively applied to either side of piston 18 and to permit either side of the piston to be selectively connected to atmosphere to thereby control the movement of piston 18 in a manner that is more fully described hereinafter.

The cylinder 20 is provided with means, which when actuated, is capable of positively locking the shaft 18 from movement and, accordingly, locking electrode 16 from movement. To this end, a pair of arcuate metallic friction shoes 26 and 28 are provided that can move radially of shaft 18. The shoes 26 and 28 have respectively inner annular surfaces 26A and 28A that can be forced into contact with shaft 18. The shoes 26 and 28 are disposed between an inner surface of the end housing 20A and a retainer ring 30 that is fixed to cylinder 20. Disposed about the shoes 26 and 28 is an annular rubber bladder 32 that will expand when air pressure is applied to the interior 32A thereof. If the interior 32A of bladder 32 is not pressurized, the shaft 18 will not be tightly gripped by shoe surfaces 26A and 28A so that shaft 18 can freely move in either direction. However, when the interior 32A of bladder 32 is pressurized by air pressure, it expands and will force shoes 26 and 28 inwardly so that shoe surfaces 26A and 28A tightly engage shaft 18. The shaft 18 will now be positively locked against movement due to the frictional forces provided by the engagement of shoe surfaces 26A and 28A with shaft 18. Accordingly, electrode 16 will be locked from movement.

The welding system has a source of air pressure designated as 34. This source of pressure is connected to a conduit or pipe 36 which is connected to a solenoid operated valve 38. The source 34 is also connected to conduit 39 which is connected to another solenoid operated valve 40. The valve 40 is connected to atmosphere via conduit 42. Further, valve 40 is connected to the interior 32A of bladder 32 by a conduit 44 and port or a passage 46.

The valve 40 has a solenoid 47 that can be energized by a conductor 48. Valve 40 can be arranged such that when the solenoid 47 is not energized, the valve connects conduit 44 to conduit 42 or, in other words, connects conduit 44 to atmosphere. This vents the interior 32A of bladder 32 to atmosphere so that piston shaft 18 can move freely in either direction, that is, shaft 18 is not locked from movement. In this position of valve 40, conduit 39 is not disconnected from conduits 42 and 44.

When solenoid 47 is energized, the valve 40 disconnects conduit 42 from conduits 39 and 44 and connects conduits 39 and 44. Air pressure is now applied to the interior 32A of bladder 32 with the result that shoe surfaces 26A and 28A are forced into tight engagement with shaft 28 to lock it and electrode 16 from movement.

The other control valve 38 of the welding system controls the direction of movement of piston 22. This valve has a solenoid 50 connected to a conductor 52. Valve 38 is connected to conduits 54, 56 and 58. Conduit 58 is connected to atmosphere. Conduit 54 is connected to one side of piston 22 by port 24. Conduit 56 is connected to the opposite side of piston 22 by port 23.

Valve 38 can be arranged such that when solenoid 50 is not energized, the valve connects conduits 56 and 58 and connects conduits 36 and 54. Piston 22 is now moved into engagement with end housing 20B. This movement of piston 22 moves electrode 16 to a retracted position out of engagement with part 10.

When solenoid 50 is energized, valve 38 connects conduits 36 and 56 and connects conduits 54 and 58. Piston 22 is now forced to move in a direction to cause electrode 16 to engage part 10 and apply clamping or welding force to part 10.

Welding current is supplied to electrodes 14 and 16 by conductors 60 and 62 that are electrically connected respectively to electrodes 16 and 14. The electrical connection to electrode 16 is through an electrical connector 63 connected to electrode 16. These conductors 60 and 62 are connected to weld current supply 64 which supplies welding current to electrodes 14 and 16.

The movement of piston 22, the locking and unlocking of shaft 18 by bladder 32 and the turning on and turning off of welding current is sequentially controlled by a weld controller 66. The controller is connected to conductors 48 and 52 to control valves 38 and 40. Further, controller 66 is connected to weld current supply 64 by a control line or conductor 68. The signal on line 68 from controller 66 determines whether or not welding current is supplied to electrodes 16 and 14.

The operation of the welding system will now be described. Assume that parts 10 and 12 are positioned as shown in the drawing. The first step executed by controller 66 is to control valve 38 such that electrode 16 is forced into contact with part 10 with a predetermined clamping or welding force. The force applied to part 10 must be high enough to assure that an acceptable spot weld 70 will be made. It is pointed out that when electrode 16 forces part 10 against the wall 12A of tubular part 12, the wall 12A may bow or bulge inwardly to some extent and walls 12B and 12C may bow or bulge outwardly to some extent.

Tubular part 12 may, therefore, bulge to a certain extent and it then springs back to maintain tight contact between part 10 and an outer surface of wall 12A. The force applied to electrode 16 will cause a slight indentation in part 10 and wall 12A, as shown in the drawing. However, this indention is minimal.

The next step executed by controller 66 is lock the shaft 18 from movement. This is accomplished by causing interior 32A of bladder 32 to be pressurized. Piston rod 18 is now positively locked from movement. There is a slight time delay between the application of clamping or welding force to electrode 16 and lock-up to allow electrode 16 to move to its full extent in the clamping direction before it is locked in its final position.

With electrode 16 in its final locked position, the controller 66 now causes weld current to be applied to electrodes 16 and 14. Weld current is now applied for a predetermined time period to make the spot weld. Weld current flows, for example, from electrode 16 through part 10 and into wall 12A, in opposite directions through wall 12A to walls 12B and 12C, and then in opposite directions through wall 12D to electrode 14.

As welding current is applied, the yield strength of the area of material of part 10 and part 12 that are being heated to fusion by welding current decreases dramatically with the result that were it not for the fact that welding electrode 16 is positively locked from movement, the clamping or welding force applied to electrode 16 would cause it to move into the heated area thereby causing an excessive indentation in part 10 and wall 12A. Putting it another way, if the welding apparatus did not have some means for preventing movement of electrode 16, the clamping force provided by cylinder 20 would cause an excessive indentation of part 10 and wall 12A.

After welding current is terminated, the controller 66 maintains piston shaft and electrode 16 locked from movement for a predetermined hold-time that is long enough to allow the weld to cool.

At the expiration of the hold-time, the controller unlocks piston shaft 18 by venting interior 32A of bladder 32 to atmosphere. Piston shaft 18 is now free to move. Valve 38 is now actuated to cause piston 22 to move to a retracted position against cylinder housing 20B. This, of course, retracts electrode 16 away from part 10 so that welded parts 10 and 12 can now be removed.

The following summarizes the sequence of steps that take place in the spot welding of part 10 to tubular part 12.

(1) With the parts 10 and 12 positioned as shown in the drawing, electrode 16 is brought into contact with part 10 and a welding force of a predetermined magnitude is applied to electrode 16 by cylinder 20.

(2) After a short time delay following the application of clamping force to electrode 16, the electrode is positively locked from movement.

(3) After lock-up has been completed, welding current is applied to electrodes 16 and 14 for a predetermined time period sufficient to make a good weld. Lock-up is maintained while welding current is applied.

(4) Welding current is terminated. Lock-up is maintained for a predetermined hold-time.

(5) The piston rod is unlocked and the piston is then moved in a direction to retract electrode 16.

This invention is not limited to the specific apparatus shown in the drawing for locking electrode 16 from movement. Thus, the locking mechanism could be located outside of the cylinder instead of inside the cylinder as shown. Further, the welding apparatus could take the form of a welding gun that has movable arms. Thus, in accordance with the broader aspects of this invention, a locking mechanism can be provided that cooperates with any movable part of the welding apparatus and which is operative to positively lock a welding electrode from movement.

The embodiments of the invention in which an exclusive property or privilege is claimed are defined as follows:

1. The method of resistance spot welding a pair of metallic parts, the steps comprising, disposing said parts between a pair of welding electrodes, moving one of said electrodes into contact with one of said parts and applying a welding force to said one electrode that is operative to tightly clamp said parts together and between said electrodes, applying a welding current to said electrodes while maintaining said one electrode locked from movement in a direction into the part that it engages, terminating the supply of welding current to said electrodes, unlocking said one welding electrode to allow it to move and then moving said one electrode to a retracted position.

2. The method of resistance spot welding a pair of metallic parts, the steps comprising, disposing said parts between a pair of welding electrodes, moving one of said electrodes into contact with one of said parts and applying a welding force to said one electrode that is operative to tightly clamp said parts together and between said electrodes, locking said one electrode from movement in a direction into the part that it engages, applying a welding current to said electrodes for a predetermined time period while maintaining said one electrode locked from movement, maintaining said one electrode locked from movement for a predetermined time period subsequent to the termination of the supply of welding current to said electrodes, unlocking said one welding current to allow it to move and then moving said one electrode to a retracted position.

3. The method of single-sided resistance spot welding a first metallic part to a second tubular metallic part, the steps comprising, disposing said parts between first and second opposed welding electrodes with said first part engaging a first outer wall surface of said tubular part and with a second opposed outer wall surface of said tubular part facing said second electrode, clamping said parts together with a predetermined welding force by moving at least one of said electrodes toward the other electrode, said first electrode engaging said first part and said second electrode engaging said second outer wall surface of said tubular part, locking said first electrode from movement in a direction into said first part, applying a welding current into said electrodes while maintaining said first electrode locked from movement, terminating of the supply of welding current to said electrodes, unlocking said first electrode to allow it to move and then moving said first electrode to a retracted position.

4. The method of single-sided resistance spot welding a first metallic part to a second tubular metallic part, the steps comprising, disposing said parts between first and second opposed welding electrodes with said first part engaging a first outer wall surface of said tubular part and with a second opposed outer wall surface of said tubular part and with a second opposed outer wall surface of said tubular part facing said second electrode, clamping said parts together with a predetermined welding force by moving at least one of said electrodes toward the other electrode, said first electrode engaging said first part and said second electrode engaging said second outer wall surface of said tubular part, locking said first electrode from movement in a direction into said first part, applying a welding current to said electrodes for a predetermined time period while maintaining said first electrode locked from movement, maintaining said first electrode locked from movement for a predetermined time period subsequent to the termination of the supply of welding current to said electrodes, unlocking said first electrode to allow it to move and then moving said first electrode to a retracted position.

5. A resistance spot welding apparatus comprising, first and second electrodes that are adapted to respectively engage metallic parts disposed between the electrodes to apply welding current to the parts, means for causing one of said electrodes to move toward the other electrode to thereby clamp said parts between said electrodes with a predetermined clamping force, said last named means comprising a fluid pressure cylinder having a shiftable piston and a connecting means connected between said piston and said first electrode operative to move said first electrode with movement of said piston, locking means associated with said connecting means operative when actuated to lock said first electrode from movement in a direction into one of said parts, and control means for selectively actuating said locking means.

6. The spot welding apparatus according to claim 5 where said locking means comprises means shiftable into engagement with a shaft connected to said piston.

7. The spot welding apparatus according to claim 5 where said locking means comprises means shiftable by the application of fluid pressure to the locking means.

8. The spot welding apparatus according to claim 5 where said locking means is located in said cylinder and further wherein said locking means has friction shoes that can be forced into engagement with a shaft connected to said piston.

* * * * *